(12) United States Patent
Frommelt et al.

(10) Patent No.: US 10,824,301 B2
(45) Date of Patent: Nov. 3, 2020

(54) METHODS AND SYSTEMS FOR DETERMINING DATA FEED PRESENTATION

(71) Applicant: MOTOROLA SOLUTIONS, INC., Chicago, IL (US)

(72) Inventors: Brian J. Frommelt, Deer Park, IL (US); Tetyana Gutsol, Chicago, IL (US); John L. Finch, McHenry, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/048,310

(22) Filed: Jul. 29, 2018

(65) Prior Publication Data

US 2020/0034001 A1 Jan. 30, 2020

(51) Int. Cl.
*G06F 3/0482* (2013.01)
*H04W 4/90* (2018.01)
*H04N 21/431* (2011.01)
*H04N 7/18* (2006.01)

(52) U.S. Cl.
CPC .......... *G06F 3/0482* (2013.01); *H04N 7/181* (2013.01); *H04N 21/4312* (2013.01); *H04W 4/90* (2018.02)

(58) Field of Classification Search
None
See application file for complete search history.

(56) References Cited

U.S. PATENT DOCUMENTS

| | | | |
|---|---|---|---|
| 9,541,407 B1 * | 1/2017 | Mohler | .................. H04W 4/90 |
| 2010/0332131 A1 | 12/2010 | Horvit et al. | |
| 2012/0206605 A1 * | 8/2012 | Buehler | ........... G08B 13/19645 348/159 |
| 2013/0039542 A1 * | 2/2013 | Guzik | .................. G11B 27/034 382/103 |
| 2014/0368601 A1 * | 12/2014 | deCharms | ............. H04W 4/021 348/14.02 |
| 2015/0019982 A1 * | 1/2015 | Petitt, Jr. | ............... H04W 4/029 715/738 |
| 2017/0223302 A1 * | 8/2017 | Conlan | .............. H04N 5/44504 |
| 2018/0033288 A1 * | 2/2018 | Strack | .................. G08B 25/016 |

OTHER PUBLICATIONS

International Search Report & Written Opinion dated Oct. 23, 2019 for related International Application No. PCT/US2019/043210 (17 pages).

* cited by examiner

*Primary Examiner* — Christopher J Fibbi
(74) *Attorney, Agent, or Firm* — Michael Best and Friedrich LLP

(57) ABSTRACT

Methods and systems for determining whether to present one or more data feeds on a communication device. One system includes an electronic computing device including a network interface configured to receive one or more data feeds from one or more network-connectable devices. The data feeds are associated with an incident. The electronic computing device further includes an electronic processor configured to determine an incident type of the incident, and determine a quantity of data feeds associated with the incident. The electronic processor is further configured to determine whether to present the data feeds on a communication device based on the incident type and the quantity of data feeds. The data feeds are presented via an output device of the communication device in response to the electronic processor determining that the data feeds are to be presented on the communication device.

18 Claims, 6 Drawing Sheets

METHODS AND SYSTEMS FOR DETERMINING DATA FEED PRESENTATION

BACKGROUND OF THE INVENTION

The use of devices such as tablets, laptop computers, desktop computers, telephones (for example, cellular, landline, or satellite), devices with an interactive display, other communication devices, and combinations thereof has become prevalent. These devices provide users with instant access to increasingly valuable information, resources, and databases. When used in a public safety context and depending on access authorization, a user might access such information as vehicle histories, arrest records, outstanding warrants, health information, real-time traffic or other situational status information, and the like. This type of information may aid the user in making informed decisions, for example, of next action to take or how to resolve a situation.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
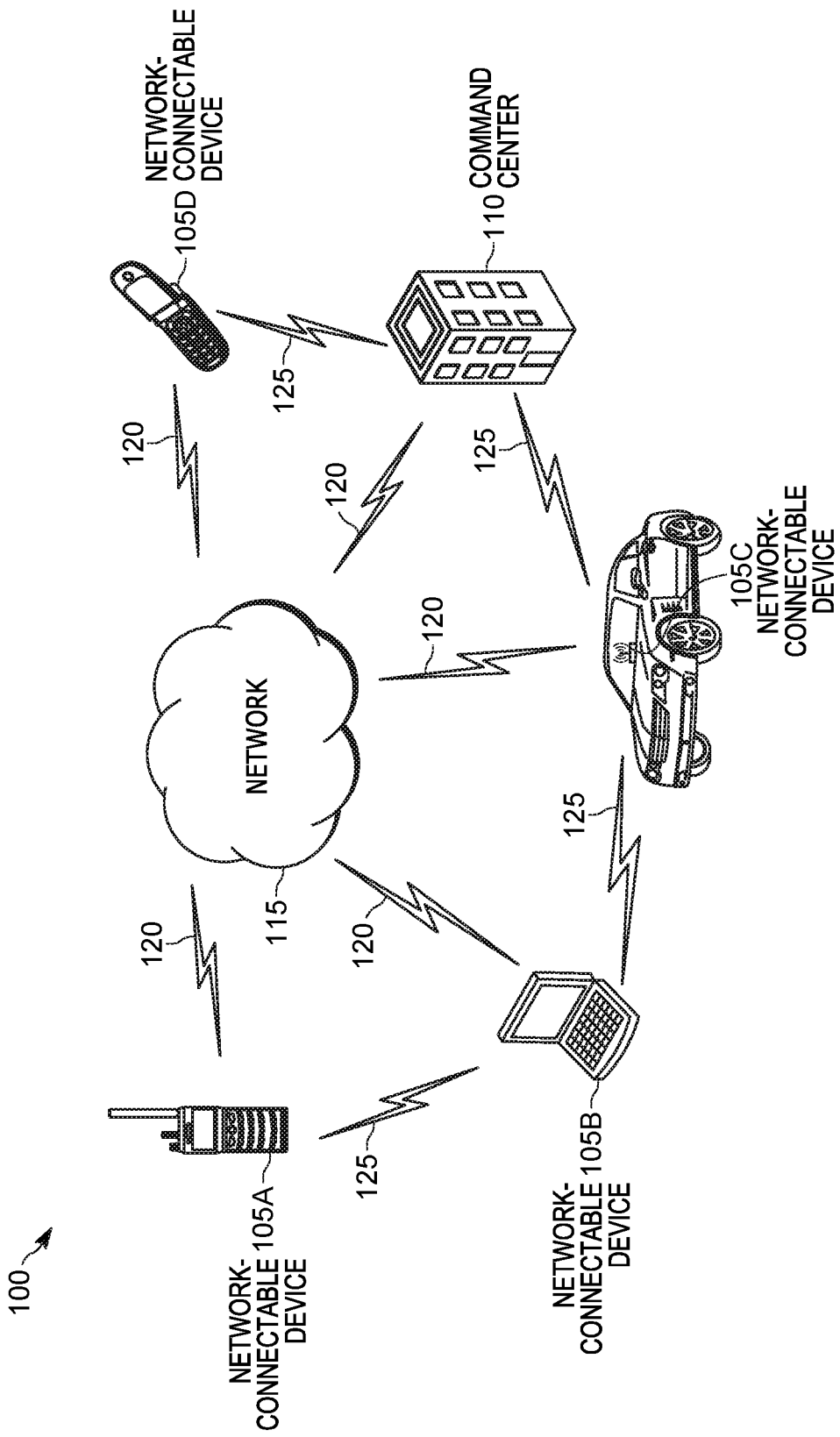
FIG. 1 is a block diagram of a communication system according to one example embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One or more devices such as tablets, laptops, desktop computers, telephones (for example, cellular, landline, or satellite), devices with an interactive display, and other communication devices may be a part of a dispatch console operated by a dispatcher such as a public safety dispatcher. In some situations, a public safety command center includes one or more dispatch consoles each operated by a different dispatcher. In some situations, the dispatchers include emergency call-takers and incident-handling dispatchers. In some embodiments, an emergency call-taker is a person who analyzes a received data feed from a citizen via an emergency call-taker device (for example, voice call, live or recorded video feed, text message, and the like), identifies an incident based on the data feed, and decides how to respond to the data feed to help the citizen and handle the incident. For example, the emergency call-taker may transfer the data feed to a different agency (for example, animal control), take no action (for example, when the data feed is a prank call or an accidental call), transfer the data feed to the dispatch console of an incident-handling dispatcher, and the like.

In some situations, a dispatch console of an incident-handling dispatcher receives one or more data feeds from citizens in response to an emergency call-taker using an emergency call-taking device to transfer the one or more data feeds to the dispatch console of the incident-handling dispatcher. In some situations, the incident-handling dispatcher is temporarily assigned to an incident in which officers are supervising, maintaining, providing assistance, and the like (for example, a concert, a sporting event, management of a theme park or other entertainment venue, and the like). In some embodiments, the incident is an event, occurrence, or situation in which officers are involved. In some embodiments, the incident is a public safety incident in which public safety officers are called to a location to provide assistance in resolving or preventing a societal or environmental problem (for example, a location where a suspect is committing or has committed a crime, a fire, a vehicular accident, a traffic stop, and the like).

In some embodiments, the dispatch console of the incident-handling dispatcher additionally or alternatively receives one or more data feeds from devices of officers handling the incident. In some embodiments, officers are personnel acting on behalf of a dispatching, supervising, or responsible agency/entity (for example, employees of a theme park; security guards at a concert or sporting event; public safety officers such as police officers, firefighters, and paramedics; and the like). As an example of the dispatch console receiving data feeds from devices of officers, the dispatch console of the incident-handling dispatcher receives a video feed or an image feed from one or more of a camera of a network-connectable device such as a smart telephone, a dash camera of a vehicle, and a body-worn camera of an officer. As another example, the dispatch console of the incident-handling dispatcher receives a data feed from a biometric sensor that monitors biometric data of an officer. In some embodiments, the dispatch console receives a data feed from a device that is not operated by a citizen or an officer such as one or more of a security camera, a traffic camera, an alarm system that monitors a building (for example, a fire alarm, a toxic gas alarm, and the like), and the like.

In some embodiments, the dispatch console of an incident-handling dispatcher presents the one or more received data feeds to the dispatcher via an output device (for example, visually via a display, audibly via a speaker, and the like). While presenting all available data feeds to the dispatcher may be useful in some situations, in other situations, presenting too many data feeds to the dispatcher may prevent the dispatcher from effectively monitoring the data feeds. For example, the dispatcher may not be able to effectively monitor more than two video feeds presented on a display simultaneously. As another example, the dispatcher may not be able to effectively monitor more than five biometric data feeds presented on the display simultaneously. Additionally, using a standard policy that determines to always present or never present data feeds on the dispatch console may overwhelm a dispatcher with information that is not valuable or may fail to present information to the dispatcher that may be valuable. Similarly, using a standard policy may cause the dispatch console to present too much valuable information such that the dispatcher may not effectively monitor the displayed information. Thus, there is a technological problem with respect to the interaction between a user (for example, a dispatcher) and a user interface that presents one or more received data feeds to the user (for example, one or more output devices of a dispatch console).

Disclosed are, among other things, a method, device, and system for one or more electronic processors to determine whether to present one or more data feeds on a communication device (for example, a dispatch console). In some embodiments, the one or more electronic processors determine whether to present the one or more data feeds on the communication device based on the quantity of data feeds associated with an incident and based on an incident type of the incident. In some embodiments, the one or more electronic processors determine not to present the one or more data feeds on the communication device but instead determine to display a list of available data feeds to be selected by the dispatcher. Certain examples of the disclosed method, device, and system solve the above-noted technological problem by improving the interaction between a user and a user interface that presents one or more received data feeds. In other words, the disclosed method, device, and system present one or more data feeds to a dispatcher when the method, device, and system determine that the one or more data feeds may be effectively monitored by the dispatcher. However, when the disclosed method, device, and system determine that the one or more data feeds are unlikely to be effectively monitored by the dispatcher (for example, because there are too many available data feeds), the one or more data feeds are not presented to the dispatcher. Thus, the disclosed method, device, and system may prevent cognitive overload of a dispatcher that may result when too much information is presented to the dispatcher via a dispatch console.

One embodiment provides an electronic computing device including a network interface configured to receive one or more data feeds from one or more network-connectable devices. The one or more data feeds are associated with an incident. The electronic computing device further includes an electronic processor configured to determine an incident type of the incident, and determine a quantity of data feeds associated with the incident. The electronic processor is further configured to determine whether to present the one or more data feeds on a communication device based on the incident type and the quantity of data feeds. The one or more data feeds are presented via an output device of the communication device in response to the electronic processor determining, based on the incident type and the quantity of data feeds, that the one or more data feeds are to be presented on the communication device.

Another embodiment provides a method of determining whether to present one or more data feeds on a communication device. The method includes receiving, via a network interface of an electronic computing device, the one or more data feeds from one or more network-connectable devices. The one or more data feeds are associated with an incident. The method further includes determining, with an electronic processor of the electronic computing device, an incident type of the incident. The method further includes determining, with the electronic processor, a quantity of data feeds associated with the incident. The method further includes determining, with the electronic processor, whether to present the one or more data feeds on the communication device based on the incident type and the quantity of data feeds. The method further includes presenting the one or more data feeds via an output device of the communication device in response to determining, based on the incident type and the quantity of data feeds, that the one or more data feeds are to be presented on the communication device.

FIG. 1 is a block diagram of a communication system 100 according to one example embodiment. The communication system 100 includes various network-connectable devices 105A through 105D. In the following description, when explaining how a single network-connectable device functions, a reference to network-connectable device 105 is used. As indicated by FIG. 1, the network-connectable device 105 may be any one of a number of different types of network-connectable devices. For example, network-connectable device 105A is a portable communication device carried by an officer during patrol (for example, an employee of a theme park; a security guard at a concert or sporting event; a public safety officer such as police officer, firefighter, and paramedic; and the like). In some embodiments, network-connectable device 105A is a smart phone, a battery powered portable radio, a body wearable camera, a biometric sensor, or similar device. As another example, network-connectable device 105B is a laptop computer that can receive input from a user via a keyboard, a touchscreen display, a microphone (for example, voice commands), and the like. In other embodiments, network-connectable device 105B is a tablet, a desktop computer, or a similar device. As another example, network-connectable device 105C is a vehicular mobile communication device (for example, a police vehicle, a fire truck, an ambulance, a maintenance vehicle such as a tow truck, and the like). Network-connectable device 105C may include, but is not limited to, a dashboard camera, a microphone, a laptop, and the like. As yet another example, network-connectable device 105D is a smart phone operated by a civilian. Network-connectable device 105D may be any type of network-connectable device (for example, a laptop, desktop computer, tablet, smart watch, and the like).

The types of network-connectable devices 105A through 105D described above and shown in FIG. 1 are merely examples. In other embodiments, the communication system 100 includes other types of network-connectable devices. In some embodiments, the communication system 100 includes more or fewer network-connectable devices 105 than the quantity of network-connectable devices 105 shown in FIG. 1.

As shown in FIG. 1, the communication system 100 also includes a command center 110. For example, the command center 110 is a security management office at a theme park or a public safety command center such as a police headquarters, fire station, dispatch center, public safety answering point (PSAP), operations center, command and control facility, and the like. In some embodiments, the command center 110 includes one or more network-connectable devices 105 that are part of the communication system 100 as explained below with respect to FIG. 2. In the following description, when explaining communication to or from the command center 110, it should be understood that such communication is occurring to or from one or more of the network-connectable devices 105 included in the command center 110.

As indicated in FIG. 1, the network-connectable devices 105A through 105D and the command center 110 may communicate with each other over a network 115 over respective wireless links 120 and via corresponding network interfaces including one or more transceiver circuits (for example, by sending and receiving radio signals). The network 115 may include wireless and wired portions. All or parts of the network 115 may be implemented using various existing networks, for example, a cellular network, the Internet, a land mobile radio (LMR) network, a Bluetooth™ network, a wireless local area network (for example, Wi-Fi), a wireless accessory Personal Area Network (PAN), a Machine-to-machine (M2M) autonomous network, and a public switched telephone network. The network 115 may also include future developed networks. In some embodiments, the network 115 may also include a combination of the networks mentioned.

Also as shown in FIG. 1, in some embodiments, the network-connectable devices 105A through 105D and the command center 110 may communicate directly with each other via direct-mode wireless link(s) 125 using a communication channel or connection that is outside of the network 115. For example, the network-connectable devices 105A through 105D and the command center 110 communicate directly with each other when they are within a predetermined distance from each other. Although FIG. 1 only shows direct-mode wireless links 125 between adjacent network-connectable devices 105, in some embodiments, any one of the network-connectable devices 105 and the command center 110 is capable of communicating with another network-connectable device 105 or the command center 110 via a direct-mode wireless link 125.

Figure 2:
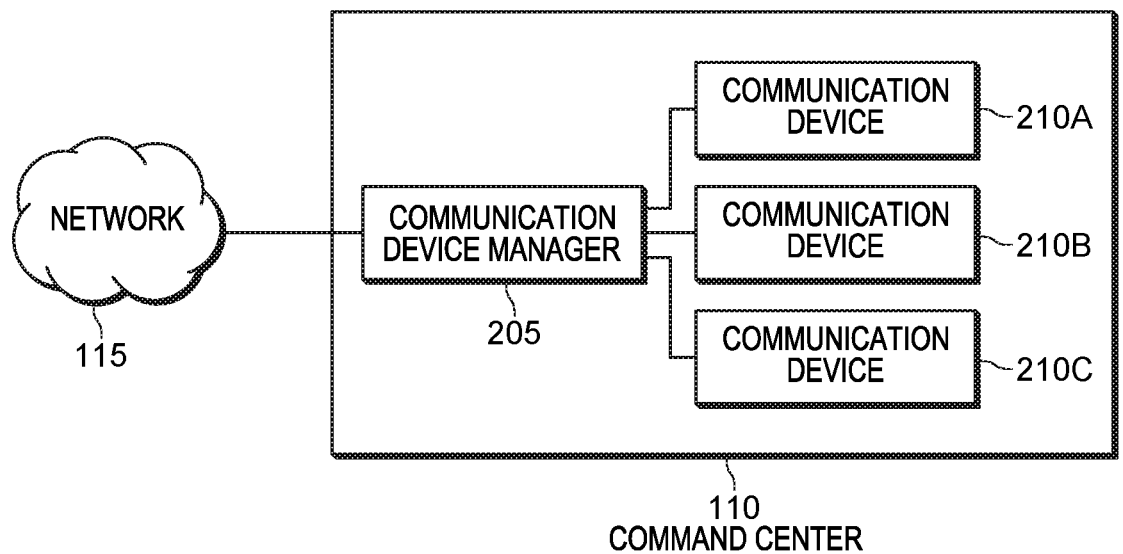
FIG. 2 is a block diagram of a command center included in the communication system of FIG. 1 according to one example embodiment.

FIG. 2 is a block diagram of the command center 110 according to one example embodiment. In some embodiments, the command center 110 includes a communication device manager 205 and a plurality of communication devices 210A through 210C that are similar to and may be considered network-connectable devices 105 of FIG. 1 as explained above. In the following description, when explaining how a single communication device functions, a reference to communication device 210 is used. In some embodiments, the communication devices 210 are dispatch consoles that are each operated by a separate dispatcher (for example, public safety dispatch consoles each operated by a separate incident-handling dispatcher as explained above). In some embodiments, the communication device manager 205 is communicatively coupled to the network 115 and to the communication devices 210A through 210C via wired connections, wireless connections, or a combination thereof. As explained in greater detail below, the communication device manager 205 is configured to receive one or more data feeds from one or more network-connectable devices 105 over the network 115. In some embodiments, the communication device manager 205 is configured to control which received data feeds are provided to which communication devices 210 and whether the received data feeds are to be presented on the respective communication devices 210. In some embodiments, the communication devices 210 are configured to communicate through the communication device manager 205 to one or more network-connectable devices 105 over the network 115.

Although the communication devices 210 are described as being located at the command center 110, in some embodiments, the communication devices 210 are portable devices such as the network-connectable devices 105 described above. Additionally, the terms "network-connectable device" and "communication device" are used throughout this specification to explain example use situations. However, a single device, for example, a portable radio of a public safety officer, may be considered a network-connectable device 105 in one situation and may be considered a communication device 210 in another situation.

In some embodiments, the command center 110 includes additional communication devices operated by emergency call-takers that receive one data feed at a time from a queue of data feeds intended for the command center 110. For example, the emergency call-takers are 911 call-takers operating 911 call-taking devices that receive data feeds from citizens who enter 9-1-1 on their network-connectable device 105 to transmit a data feed to the command center 110. In such embodiments, these additional communication devices operated by emergency call-takers may be integrated into the communication device manager 205 or may be communicatively coupled to the communication device manager 205. Similarly, while FIG. 2 shows the communication devices 210 and the communication device manager 205 as separate devices, in some embodiments, the communication devices 210 are integrated into the communication device manager 205 and directly controlled by the communication device manager 205. In other embodiments, the command center 110 may not include a separate communication device manager 205 and the functionality of the communication device manager 205 described below may be integrated into each of the communication devices 210. In some embodiments, the command center 110 includes more or fewer communication devices 210 than the quantity of communication devices 210 shown in FIG. 2.

Figure 3:
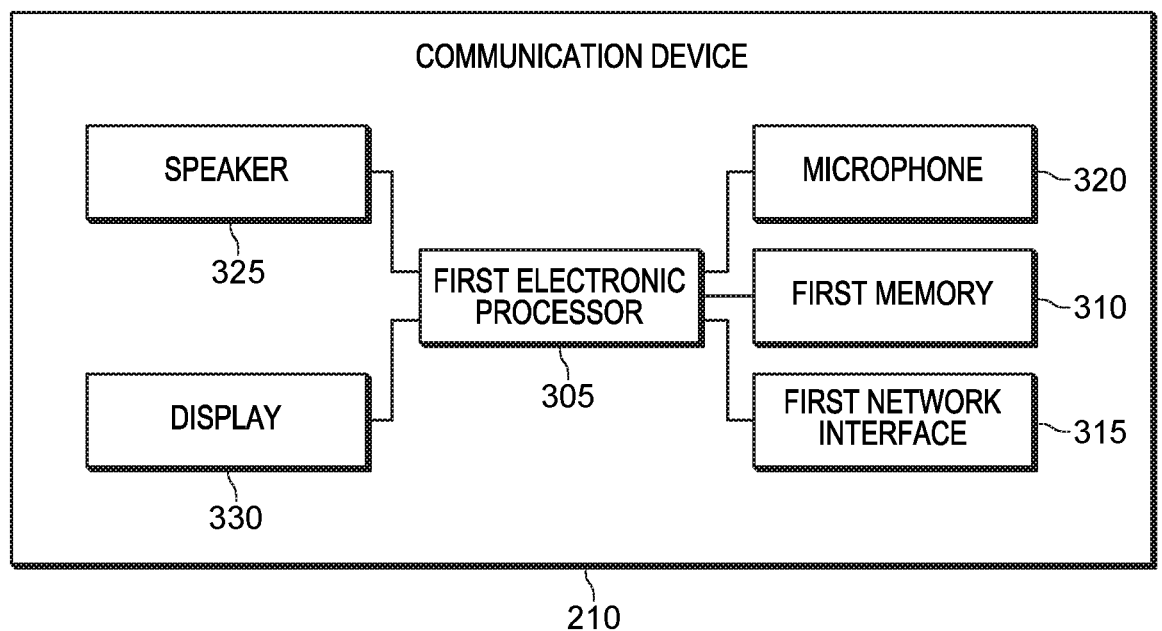
FIG. 3 is a block diagram of a communication device included in the command center of FIG. 2 according to one example embodiment.

FIG. 3 is a block diagram of a communication device 210 according to one example embodiment. In the embodiment illustrated, the communication device 210 includes a first electronic processor 305 (for example, a microprocessor or other electronic device). The first electronic processor 305 includes input and output interfaces (not shown) and is electrically coupled to a first memory 310, a first network interface 315, a microphone 320, a speaker 325, and a display 330. In some embodiments, the communication device 210 includes fewer or additional components in configurations different from that illustrated in FIG. 3. For example, the communication device 210 may additionally include a push-to-talk button or a camera. As another example, the communication device 210 may include one or more additional input devices such as a computer mouse and/or a keyboard that receive inputs from a user of the communication device 210. As yet another example, the communication device 210 may be an information-receiving device that receives and displays information without including data transmission capabilities. In some embodiments, the communication device 210 performs functionality other than the functionality described below.

The first memory 310 may include read only memory (ROM), random access memory (RAM), other non-transitory computer-readable media, or a combination thereof.

The first electronic processor 305 is configured to receive instructions and data from the first memory 310 and execute, among other things, the instructions. In particular, the first electronic processor 305 executes instructions stored in the first memory 310 to perform the methods described herein. In some embodiments, the first memory 310 is implemented on devices located at the command center 110, at a remote location, or at a remote cloud-computing cluster.

The first network interface 315 sends and receives data to and from the communication device manager 205. In some embodiments, the first network interface 315 additionally or alternatively sends and receives data to and from the network 115 without the data first passing through a separate communication device manager 205. In some embodiments, the first network interface 315 includes one or more transceivers for wirelessly communicating with the communication device manager 205 and/or the network 115. Alternatively or in addition, the first network interface 315 may include a connector or port for receiving a wired connection to the communication device manager 205 and/or the network 115, such as an Ethernet cable. The first electronic processor 305 may receive one or more data feeds (for example, a video feed, an audio feed, an image feed, a text feed, a sensor input data feed, and the like) over the network 115 through the first network interface 315 (for example, data feeds generated by one or more network-connectable devices 105 and transmitted over the network 115). In some embodiments, the first electronic processor 305 receives data feeds through the first network interface 315 directly from a network-connectable device 105. In some embodiments, communication of data feeds may occur in approximately real-time. The first electronic processor 305 may communicate data generated by the communication device 210 over the network 115 through the first network interface 315, such as for receipt by one or more network-connectable devices 105. For example, the first electronic processor 305 receives electrical signals representing sound from the microphone 320 and may communicate information relating to the electrical signals over the network 115 through the first network interface 315 to other devices, for example, to one or more network-connectable devices 105. Similarly, the first electronic processor 305 may output the one or more data feeds received from the network 115 through the first network interface 315, for example from a network-connectable device 105, through the speaker 325, the display 330, or a combination thereof.

The display 330 displays images, video, text, and/or data from sensor inputs to the user (for example, an incident-handling dispatcher). The display 330 may be a liquid crystal display (LCD) screen or an organic light emitting display (OLED) display screen. In some embodiments, a touch sensitive input interface may be incorporated into the display 330 as well, allowing the user to interact with content provided on the display 330. In some embodiments, the display 330 includes a projector or future-developed display technologies. In some embodiments, the speaker 325 and the display 330 are referred to as output devices that present data feeds to a user of the communication device 210 (for example, an incident-handling dispatcher). In some embodiments, the microphone 320, a computer mouse, and/or a keyboard or a touch-sensitive display are referred to as input devices that receive input from a user of the communication device 210.

In some embodiments, the network-connectable devices 105 include similar components as those shown in FIG. 3 with respect to the communication device 210. In some embodiments, the network-connectable devices 105 include fewer or additional components in configurations different from that illustrated in FIG. 3. For example, a network-connectable device 105 may also include one or more of a push-to-talk button to initiate voice communication over the network 115 (for example, an audio feed), a camera to capture a video feed and/or an image feed to be transmitted over the network 115, and a location component (for example, a global positioning system receiver) configured to determine the geographic coordinates of the location of the network-connectable device 105. In some embodiments, the network-connectable devices 105 transmit their respective location coordinates over the network 115 when transmitting data feeds to the command center 110 (for example, location information is stored as metadata associated with a data feed). Similarly, in some embodiments, the network-connectable devices 105 also include a time stamp when transmitting a data feed such that the command center 110 may determine a time of capture of the data feed. In some embodiments, the network-connectable devices 105 transmit a text feed over the network 115 to the command center 110 (for example, a text message from a smart phone, portable radio, or the like that includes alphanumeric and/or numeric data).

In some embodiments, a network-connectable device 105 also includes one or more sensors to generate data related to a user of the network-connectable device 105 and/or an environment of the network-connectable device 105. For example, the network-connectable device 105 may include a biometric sensor to monitor biometric data of a user (for example, a citizen, an officer such as a public safety officer, and the like) such as heart rate, breathing rate, body temperature, and the like. As another example, the network-connectable device 105 may include a pedometer, a sensor-enabled holster to detect when a weapon has been removed from the holster, and/or a sensor that detects when the weapon has been discharged. As yet another example, the network-connectable device 105 may include one or more sensors that monitor an environment of the user such as temperature, humidity, air quality, ambient noise level, and the like.

In some embodiments, one or more sensors communicate over the network 115 and may, themselves, be considered network-connectable devices 105. In other embodiments, one or more sensors are separate from a network-connectable device 105, and the separate sensors are not capable of directly communicating over the network 115. In such embodiments, the separate sensors (for example, a sensor-enabled holster) may communicate over the network 115 via a network-connectable device 105 (for example, a nearby smart phone, portable radio, and the like). For example, such separate sensors form a personal area network (PAN) with the network-connectable device 105 via corresponding short-range PAN transceivers, which may be based on a Bluetooth, Zigbee, Bluetooth Low Energy, WiFi, Near Field Communication (NFC), Radio Frequency ID (RFID) or other short-range wireless protocol. In such embodiments, the combination of the network-connectable device 105 and associated separate sensors that communicate monitored data to the network-connectable device 105 may be referred to as a single network-connectable device 105. In some embodiments, the network-connectable devices 105 transmit one or more sensor input data feeds over the network 115 to the command center 110, for example, to be displayed on a communication device 210 of an incident-handling dispatcher. In some embodiments, the network-connectable devices 105 perform functionality other than the functionality described above.

Figure 4:
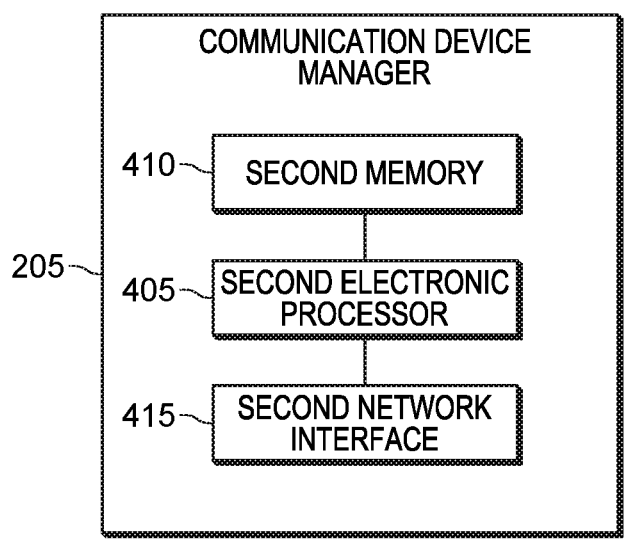
FIG. 4 is a block diagram of a communication device manager included in the command center of FIG. 2 according to one example embodiment.

FIG. 4 is a block diagram of the communication device manager 205 according to one example embodiment. In the example shown, the communication device manager 205 includes a second electronic processor 405 electrically connected to a second memory 410 and a second network interface 415. These components are similar to the like-named components of the communication device 210 explained above with respect to FIG. 3 and function in a similar manner as described above. In some embodiments, the second network interface 415 sends and receives data to and from the network 115 and the communication devices 210. In some embodiments, the communication device manager 205 includes fewer or additional components in configurations different from that illustrated in FIG. 4. For example, the communication device manager 205 may additionally include a display such as a touch screen to allow a user to reprogram settings of the methods described below. In some embodiments, the communication device manager 205 performs functionality other than the functionality described below.

As mentioned above, in some embodiments, the command center 110 further includes initial data feed-receiving devices such as emergency call-taking devices that are integrated with the communication device manager 205 to receive data feeds from the network-connectable devices 105 over the network 115. In other embodiments, the emergency call-taking devices are separate from the communication device manager 205 and are communicatively coupled between the communication device manager 205 and the network 115 to provide data feeds received from the network-connectable devices 105 over the network 115 to the communication device manager 205. In some embodiments, the emergency call-taking devices are communicatively coupled between the communication device manager 205 and the network 115 via wired connections, wireless connections, or a combination thereof.

In some embodiments, the emergency call-taking devices are configured to receive data feeds from network-connectable devices 105 operated by citizens (for example, smart phones of citizens who have entered a user input to transmit one or more data feeds to a public safety command center 110 by, for example, dialing 9-1-1). In some embodiments, each emergency call-taking device is operated by an emergency call-taker (for example, a dispatcher) that may be tasked with identifying a type of incident based on the one or more received data feeds from a network-connectable device 105. For example, the emergency call-taker may enter a user input into the emergency call-taking device to identify the incident as a robbery based on a received voice call (for example, an audio feed) where a citizen describes a robbery. In some embodiments, the emergency call-taker decides how to respond to the data feed to help the citizen and handle the incident. For example, the emergency call-taking device may receive a user input from the emergency call-taker to transfer the data feed to a different agency (for example, animal control), take no action (for example, when the data feed is a prank call or an accidental call), transfer the data feed to the communication device manager 205 to be further transferred to the communication device 210 of an incident-handling dispatcher, and the like. In the example where the emergency call-taking device transfers the data feed to the communication device manager 205, the emergency call-taking device may also transfer information corresponding to the incident type of the incident that was identified by the emergency call-taker to the communication device manager 205. In some embodiments, the emergency call-taking device also transfers information corresponding to which communication device 210 the data feed should be transmitted. For example, the emergency call-taking device receives a user input from the emergency call-taker to transfer the data feed to the communication device 210A because one or more previously-received data feeds associated with the same incident were routed to the communication device 210A. In this example, the communication device 210A of the same incident-handling dispatcher receives multiple data feeds relating to a single incident in which the incident-handling dispatcher is monitoring and handling. In some embodiments, the emergency call-taker device determines how to respond to the data feed to help the citizen and handle the incident in an automated manner (for example, using one or more of voice analytics, video analytics, text analytics, and the like to take a predetermined action based on the received data feed such as transferring the data feed to a communication device 210 of an appropriate dispatcher).

While the emergency call-taking devices are configured to receive data feeds from network-connectable devices 105 operated by citizens, in some embodiments, the communication device manager 205 directly receives data feeds from network-connectable devices 105 operated by officers such as public safety officers. For example, because the public safety officers are trained to identify and handle many different public safety incidents, it may not be necessary for an emergency call-taker to identify a type of incident or how to handle the incident when the data feed is received from a network-connectable device 105 of an officer. Rather, the network-connectable device 105 of a public safety officer may receive a user input from the officer indicating a type of incident (for example, by the officer entering a code that represents the incident type) and other information related to the incident (for example, location, number of victims, and the like). The network-connectable device 105 of the officer then transmits this information as well as any selected data feeds over the network 115 to the communication device manager 205 to be transferred to a communication device 210 of the incident-handling dispatcher that is handling the corresponding incident.

In some embodiments, data feeds are received from network-connectable devices 105 that include, for example, sensors and a camera, that are not operated by a citizen or an officer. For example, data feeds may be received from one or more of a security camera, a traffic camera, an alarm notification system that monitors one or more of a building, a park, a fence, a parking lot, and other geographical locations (for example, a fire alarm, a toxic gas alarm, and the like), and the like.

While FIGS. 3 and 4 show separate block diagrams of the communication device 210 and the communication device manager 205, as noted above, in some embodiments, the communication devices 210 and/or the emergency call-taking devices are integrated into the communication device manager 205 and directly controlled by one or more electronic processors of the communication device manager 205. In other embodiments, the functionality of the communication device manager 205 may be integrated into each of the communication devices 210 and/or the emergency call-taking devices. In some embodiments, the communication device manager 205, the communication devices 210, the emergency call-taking devices, and/or a combination thereof are referred to as an electronic computing device that performs the functionality described below. For example, the electronic computing device may be a single electronic processor (for example, the second electronic processor 405 of the communication device manager 205) or a plurality of electronic processors located in the communication device manager 205. In other embodiments, the electronic computing device includes multiple electronic processors distributed across different devices. For example, the electronic computing device is implemented on one or more of the first electronic processors 305 of the communication devices 210, the second electronic processor 405 of the communication device manager 205, and one or more electronic processors located in one or more devices located at the command center 110 (such as emergency call-taking devices), at a remote location, or at a remote cloud-computing cluster. In some embodiments, the electronic computing device is a network-connectable device 105 and an electronic processor of the network-connectable device 105 performs the functionality described below.

As explained above, a communication device 210 of an incident-handling dispatcher (for example, a dispatch console) located at the command center 110 may receive one or more data feeds from citizens (for example, voice call, live or recorded video feed, text message, and the like) in response to an emergency call-taking device transferring the one or more data feeds to the communication device 210. The communication device 210 may additionally or alternatively receive one or more data feeds from the officers handling the incident (for example, employees of a theme park; security guards at a concert or sporting event; public safety officers such as police officers, firefighters, and paramedics; and the like). For example, the dispatch console of the incident-handling dispatcher receives a video feed or an image feed from one or more of a dash camera of a vehicle, a body-worn camera of an officer, and a traffic camera. As another example, the dispatch console of the incident-handling dispatcher receives a sensor input data feed from a biometric sensor that monitors biometric data of an officer.

In some embodiments, the communication device 210 presents the one or more received data feeds to the dispatcher via an output device (for example, visually via the display 330, audibly via the speaker 325, and the like). While presenting all available data feeds to the dispatcher may be useful in some situations, in other situations, presenting too many data feeds to the dispatcher may prevent the dispatcher from effectively monitoring the data feeds. For example, the dispatcher may not be able to effectively monitor more than two video feeds presented on the display 330 simultaneously. As another example, the dispatcher may not be able to effectively monitor more than five biometric data feeds presented on the display 330 simultaneously. Thus, there is a technological problem with respect to the interaction between a user (for example, an incident-handling dispatcher) and a user interface that presents one or more received data feeds to the user (for example, one or more output devices of the communication device 210 acting as the dispatch console).

Figure 5:
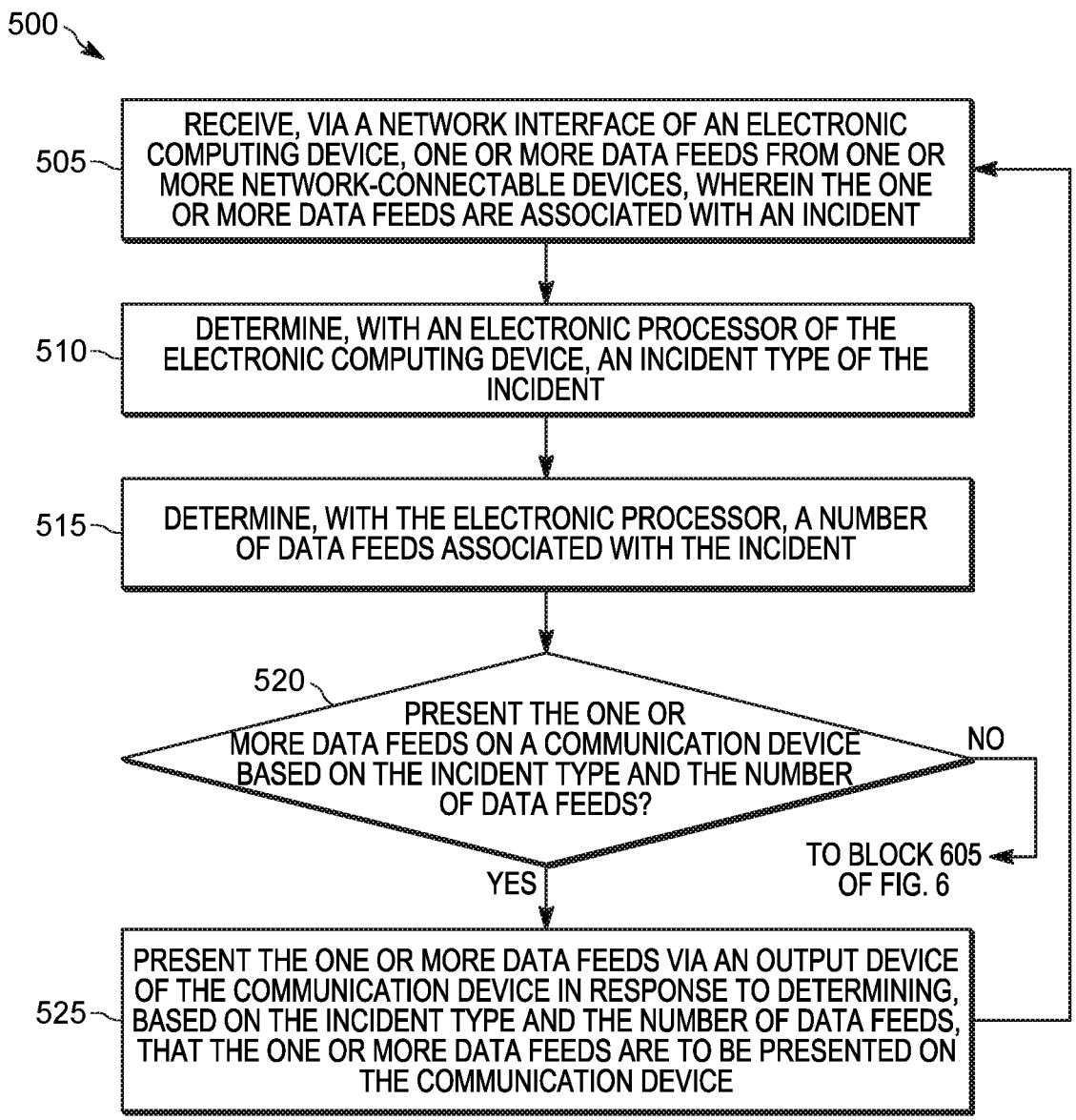
FIG. 5 is a flow chart of a method for determining whether to present one or more data feeds on the communication device of FIG. 3 according to one example embodiment.

To solve this technological problem, the electronic computing device described above performs, in one instance, one or more of the methods explained below. For example, a method 500 of FIG. 5 is executed by the electronic computing device to determine whether to present one or more data feeds on a communication device 210. The method 500 solves the above-noted technological problem by improving the interaction between a user and a user interface that presents one or more received data feeds. In other words, the method 500 presents one or more data feeds on the communication device 210 when the electronic computing device determines that the one or more data feeds may be effectively monitored by the user such as a dispatcher. However, when the electronic computing device determines that the one or more data feeds are unlikely to be effectively monitored by the user (for example, because there are too many available data feeds), the one or more data feeds are not presented on the communication device 210. Thus, the method 500 may prevent cognitive overload of a user that may result when too much information is presented to the user via the communication device 210.

FIG. 5 illustrates a flow chart of the method 500 performed by the electronic computing device for determining whether to present one or more data feeds on a communication device 210. While a particular order of processing steps, message receptions, and/or message transmissions is indicated in FIG. 5 as an example, timing and ordering of such steps, receptions, and transmissions may vary where appropriate without negating the purpose and advantages of the examples set forth in detail throughout the remainder of this disclosure.

At block 505, the electronic computing device receives, via a network interface, one or more data feeds from one or more network-connectable devices 105. For example, the network interface is the first network interface 315, the second network interface 415, or a combination thereof as described above. As explained above, the one or more data feeds include one or more of a video feed, an audio feed, an image feed, a text feed, and a sensor input data feed. The received one or more data feeds are associated with an incident. For example, the incident is an emergency situation involving an injury to a person, a natural disaster, or some other situation in which officers are supervising, maintaining, providing assistance, and the like such as a concert, a sporting event, management of a theme park or other entertainment venue, and the like. In some embodiments, the incident is a public safety incident in which public safety officers such as police officers, firefighter, paramedics, and/or the like are called to a location to provide assistance in resolving or preventing a societal or environmental problem (for example, a location where a suspect is committing or has committed a crime, a fire, a vehicular accident, a traffic stop, and the like). As explained above, the one or more data feeds may be received from network-connectable devices 105 operated by citizens (for example, a smart phone) or officers such as public safety officers (for example, a portable radio carried by an on-duty police officer, a dashboard camera of a police vehicle, a body-worn camera of a police officer, and the like). In some embodiments, an incident does not relate to a specific event but rather may indicate that received data feeds are related to each other. For example, when the electronic computing device receives data feeds associated with a public safety officer, the public safety officer may be generally on patrol rather than being engaged in handling a specific incident. Nevertheless, the received data feeds may be considered to be associated with an incident. In other words, ongoing monitoring of related data feeds may be considered monitoring an incident within the context of this specification even when a specific incident is not occurring.

With respect to data feeds received from network-connectable devices 105 of citizens, the communication device manager 205 may determine that received data feeds are associated with the same incident based on information received from one or more emergency call-taking devices that initially received the data feeds as explained above. With respect to data feeds received from network-connectable devices 105 of officers such as public safety officers, the communication device manager 205 may determine that received data feeds are associated with the same incident based on information included in the data feeds and/or information received along with the data feeds as explained above (for example, metadata including codes that represent incident type, location information, time stamps, and the like). In response to determining that a received data feed is associated with an incident in which other data feeds have been previously received and are being monitored by, for example, the communication device 210A of an incident-handling dispatcher, the communication device manager 205 provides the received data feed to the communication device 210A of the incident-handling dispatcher.

At block 510, an electronic processor of the electronic computing device determines an incident type of the incident. In some embodiments, the electronic computing device determines the incident type based on information received from an emergency call-taking device after being entered into the emergency call-taking device by an emergency call-taker as explained above. In some embodiments, the electronic computing device determines the incident type based on information included in the data feed and/or information received along with the data feed, for example, when the data feed is received from a network-connectable device 105 of an officer as explained above. In some embodiments, the electronic computing device determines the incident type by analyzing information included the data feed using a natural language processing engine, image/video recognition techniques, and/or text recognition techniques. For example, the electronic computing device determines that the incident type is a fire when the electronic computing device determines that an image feed or a video feed includes a fire using image/video recognition techniques. As another example, the electronic computing device determines that the incident type is vehicular accident when the natural language processing engine of the electronic computing device recognizes the words "car accident" in a received audio feed or text message. In some embodiments, the electronic computing device determines the incident type based on the type of sensor from which a sensor input data feed is received. For example, when a smoke detector or fire alarm transmits a signal indicating that the smoke detector or fire alarm has been triggered, the electronic computing device determines that the incident type is a fire.

At block 515, the electronic processor of the electronic computing device determines a quantity of data feeds associated with the incident. For example, the electronic computing device determines a quantity of video feeds associated with the incident that are being transmitted to the communication device 210A of the incident-handling dispatcher monitoring the incident. As another example, the electronic computing device determines a quantity of sensor input data feeds associated with the incident that are being transmitted to the communication device 210A. As mentioned above, in some embodiments, the data feeds are received by the communication device 210A in real-time (for example, a live voice call, a live video feed, and the like). In such embodiments, the electronic computing device determines a quantity of real-time data feeds associated with the incident that are being transmitted to the communication device 210A of the incident-handling dispatcher monitoring the incident.

At block 520, the electronic processor of the electronic computing device determines whether to present the one or more data feeds on a communication device 210 based on the incident type and the quantity of data feeds. For example, the electronic computing device determines, based on the incident type, whether presenting a received video feed (for example, from a body-worn camera of the officer) to the dispatcher would be potentially useful to the dispatcher. For example, when the incident is a homicide that has already occurred, the electronic computing device determines not to present the video feed on the communication device 210 of the dispatcher because the video feed may include gruesome or unpleasant images while providing little value to the dispatcher to help handle the incident. As another example, when the incident is a traffic stop, the electronic computing device determines that presenting the video feed on the communication device 210 of the dispatcher may be useful to help the dispatcher handle the incident.

Continuing this second example, when presenting the video feed on the communication device 210 may be useful to help the dispatcher handle the incident based on the incident type of the incident, the electronic computing device also determines whether to present the received video feed based on the quantity of data feeds associated with the incident that are being provided to the communication device 210. In some embodiments, the electronic computing device determines whether to present the one or more received data feeds (for example, one or more video feeds) by determining whether the quantity of data feeds is less than a predetermined threshold (for example, less than three video feeds, less than ten sensor input data feeds, and the like). In some embodiments, the predetermined threshold may be set differently for each type of data feed. For example, the predetermined threshold may be higher for sensor input data feeds than for video feeds because video feeds may be more difficult to monitor compared to sensor input data feeds.

In some embodiments, a memory of the electronic computing device stores settings and/or rules received from a user via an input device to control the predetermined threshold for one or more types of data feeds. In some embodiments, the settings and/or rules also indicate whether certain incident types include data feeds that may be useful to help the dispatcher handle the incident. In other words, the settings and/or rules used by the electronic computing device when performing the method 500 are configurable by a user such as a dispatch commander or supervisor. While stored settings and/or rules are described above with respect to the predetermined threshold for the quantity of data feeds and the incident types that may be useful to present the incident-handling dispatcher, other factors described below may also include stored user-configurable settings and/or rules. In some embodiments, the electronic computing device adjusts stored settings and/or rules based on a stored history of user interaction and performance when handling data feeds. For example, when a dispatcher has a history of viewing no more than two video feeds at a time, the electronic computing device determines that the predetermined threshold explained above is two data feeds for a communication device 210 being used by said dispatcher.

Figure 6:
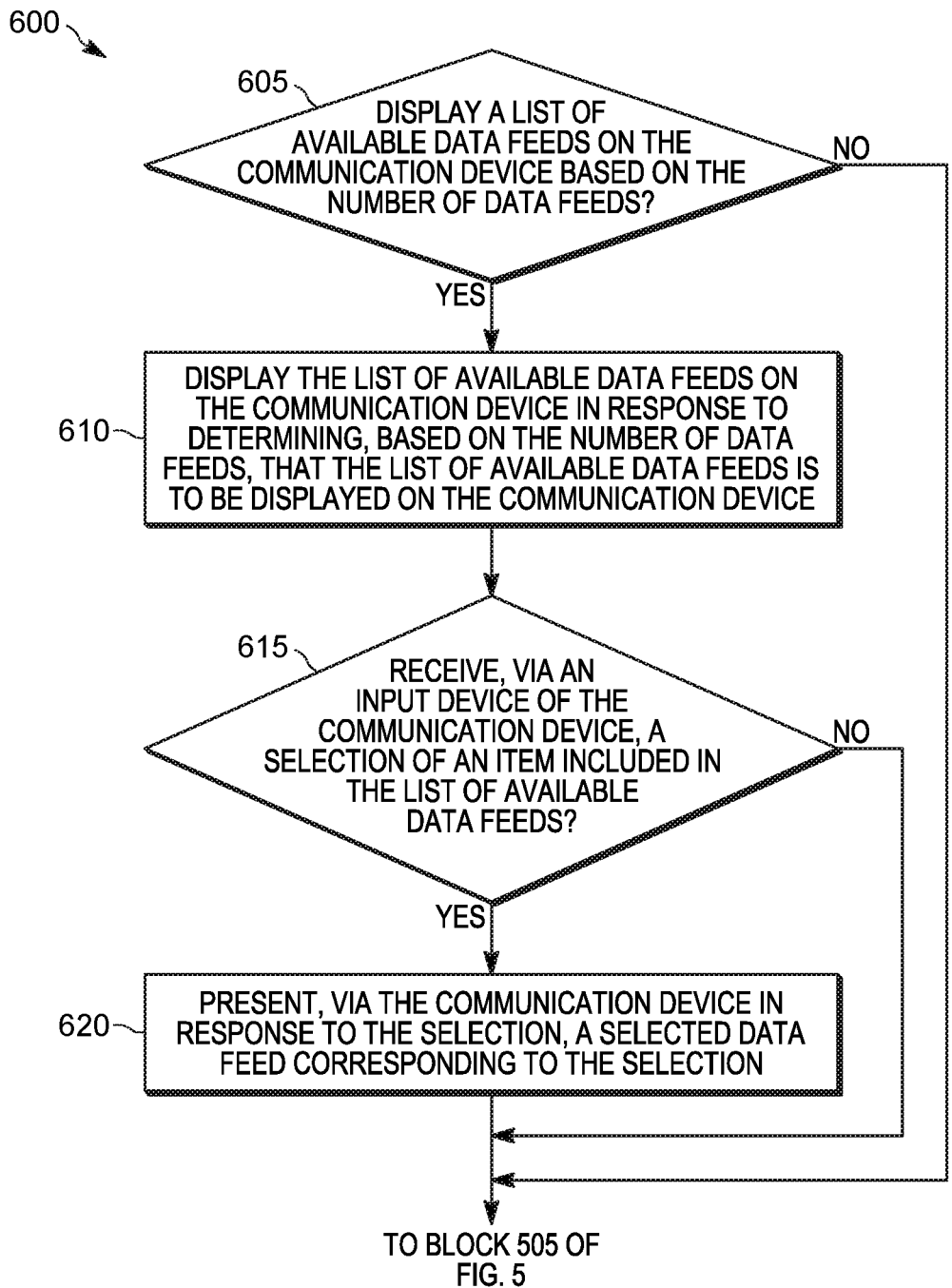
FIG. 6 is a flow chart of a sub-method for determining whether to present a list of available data feeds on the communication device of FIG. 3 and for presenting a selected data feed based on a user input received by the communication device of FIG. 3 according to one example embodiment.

When the electronic computing device determines not to present the one or more data feeds on the communication device 210 based on the incident type and the quantity of data feeds (at block 520), the method 500 proceeds to block 605 of FIG. 6 to execute a sub-method 600 to determine whether to display a list of available data feeds on the communication device 210 based on the quantity of data feeds as explained in greater detail below with respect to FIG. 6. When the electronic computing device determines to present the one or more data feeds on the communication device 210 based on the incident type and the quantity of data feeds (at block 520), the method 500 proceeds to block 525.

At block 525, the communication device 210 presents the one or more data feeds via an output device in response to the electronic computing device determining, based on the incident type and the quantity of data feeds, that the one or more data feeds are to be presented on the communication device 210. Continuing the above example, in response to determining that the quantity of received video feeds related to the traffic stop is less than the predetermined threshold, the electronic processor of the electronic computing device transmits the one or more video feeds to the communication device 210 to be presented on the display 330 of the communication device 210. For example, the electronic processor transmits the video feeds to the communication device 210 along with an indication that the data feeds are to be presented. On the other hand, when the electronic computing device determines not to present the one or more data feeds on the communication device 210 based on the incident type and the quantity of data feeds (at block 520), the electronic processor may still transmit the one or more data feeds to the communication device 210 but may also transmit an indication that the data feeds are not to be presented.

With respect to the transmitting of data feeds from the electronic processor of the electronic computing device to the communication device 210, this explanation applies to embodiments where the communication device manager 205 and the communication devices 210 are separate devices and to embodiments where the devices are integrated with each other. In other words, "transmitting of data feeds" applies to transmitting data feeds from the communication device manager 205 to a separate communication device 210 and applies to transmitting data feeds between integrated components of a single electronic computing device (for example, from the second electronic processor 405 of the communication device manager 205 to the first electronic processor 305 or the display 330 of a communication device 210.

While the electronic computing device was described above as determining whether to present the one or more data feeds on a communication device 210 based on the incident type and the quantity of data feeds (at block 520), in some embodiments, the electronic computing device is configured to determine whether to present the one or more data feeds based solely on the incident type or the quantity of data feeds being received by a particular communication device 210. For example, when the quantity of video feeds associated with the incident is less than the predetermined threshold, the electronic computing device may nevertheless determine not to present the video feed on the communication device 210 when the incident type is a homicide that has already occurred. In this example, the electronic computing device may determine not to present the video feed to the communication device 210 based solely on incident type because the video feed may include gruesome or unpleasant images while providing little value to the dispatcher to help handle the incident. As another example, the electronic computing device may not determine the incident type of the incident and may determine whether to present the one or more data feeds on the communication device 210 based solely on a comparison of the quantity of data feeds to the predetermined threshold.

In some embodiments, the electronic computing device is additionally or alternatively configured to determine whether to present the one or more data feeds on a communication device 210 based on other factors. For example, such additional factors include at least one of the group consisting of a location of the one or more network-connectable devices 105, a status of the one or more network-connectable devices 105, a status of the incident, a quantity of network-connectable devices 105 that are providing the one or more data feeds, a quantity of officers handling the incident, and a speed at which the one or more data feeds are being received. Examples of how the electronic computing device may use each of these additional factors are explained below.

As an example of the electronic computing device using a location of the one or more network-connectable devices 105 as a factor, video feeds from cameras of officers reporting to the location of the incident may be received by the electronic computing device. However, the electronic computing may determine that these video feeds would not be useful to the incident-handling dispatcher monitoring and handling the incident because, based on the location of the network-connectable devices 105, the officers have not yet arrived at the location of the incident. Accordingly, the electronic computing device may determine not to present the one or more data feeds on the communication device 210 of the dispatcher based on the location information.

Similarly, as an example of the electronic computing device using a status of the one or more network-connectable devices 105 as a factor, video feeds from cameras of officers reporting to the location of the incident may be received by the electronic computing device. However, the electronic computing may determine that these video feeds would not be useful to the incident-handling dispatcher monitoring and handling the incident because, based on the status of the network-connectable devices 105, the officers are "en route" rather than "on-scene. Accordingly, the electronic computing device may determine not to present the one or more data feeds on the communication device 210 of the dispatcher when the statuses of the network-connectable devices 105 indicate that the officers associated with the network-connectable devices 105 are "en route."

As an example of the electronic computing device using a status of the incident as a factor, a video feed and an audio feed from a body-worn camera of a public safety officer handling a traffic stop may be received by the electronic computing device. When the traffic stop is for a less severe offence such as speeding (as reported by the officer over the audio feed), the electronic computing device may determine not to present the video feed on the communication device 210. However, when the status of the incident increases to a higher severity level, by for example the driver of the vehicle fleeing the vehicle (as reported by the officer over the audio feed), the electronic computing device may determine to present the video feed on the communication device 210 to allow a dispatcher to further monitor the incident. As another example, the electronic computing device may determine a different status of an incident for the same type of incident depending on the time of day at which the incident is occurring. For example, the electronic computing device may initially determine that a noise complaint at noon is less severe than a noise complaint at midnight.

With respect to the electronic computing device using a quantity of network-connectable devices 105 that are providing the one or more data feeds as a factor, in some embodiments, the quantity of network-connectable devices 105 that are providing the one or more data feeds associated with the incident is proportional to the quantity of data feeds. For example, as the quantity of network-connectable devices 105 providing data feeds increases so does the quantity of data feeds itself. Thus, while a network-connectable device 105 may provide more than one data feed to the electronic computing device at the command center 110, the quantity of network-connectable devices 105 may provide an accurate estimate of the quantity of data feeds being received. In some embodiments, the predetermined threshold described above with respect to the quantity of data feeds may additionally or alternatively be used as a threshold with respect to the quantity of network-connectable devices 105. For example, when four public safety officers, each with a network-connectable device 105, are dispatched to the location of an incident, the electronic computing device may determine not to present video feeds received from each of their network-connectable devices 105 because the quantity of network-connectable devices 105 is not below the example predetermined threshold of three network-connectable devices 105. Similarly, the electronic computing device may determine whether to present the one or more data feeds on the communication device 210 based on a quantity of officers handling or dispatched to the incident.

As an example of the electronic computing device using a speed at which the one or more data feeds are being received as a factor, the electronic computing device may determine how quickly image feeds are being received or how often sensor input data feeds are being received. When the data feeds are being received faster than a predetermined rate, the electronic computing device determines not to present the data feeds on the communication device 210 because, for example, the incident-handling dispatcher may not be able to effectively monitor images or sensor input data that is changing at a rate faster than the predetermined rate. In some embodiments, the predetermined rate may be set differently for each type of data feed. For example, the predetermined rate may be higher for sensor input data feeds than for image data feeds because image data feeds may be more difficult to monitor compared to sensor input data feeds.

In some embodiments, the electronic computing device is configured to select a communication device 210 on which one or more data feeds are presented from among a plurality of communication devices 210 based on a role of a user associated with the communication device 210 (for example, a dispatcher). For example, the role of the user is a foreign language capability, a video analysis skill level, and the like. As an example of the role being foreign language capability, the electronic computing device may recognize that audio data received from a network-connectable device 105 is a voice call with the caller speaking in Spanish. For example, an emergency call-taking device may receive a user input from a corresponding emergency call-taker that indicates that the caller is speaking in Spanish or the electronic computing device may use voice analytics to recognize that the caller is speaking in Spanish. In response, the electronic computing device may select the communication device 210B of an incident-handling dispatcher that also speaks Spanish. As an example of the role being a video analysis skill level, the electronic computing device may determine that multiple video feeds are being received that relate to a first incident while only one video feed has been received that relates to a second incident. In response, the electronic computing device may select the communication device 210A to transmit the video feeds related to the first incident when an incident-handling dispatcher operating the communication device 210A has a higher video analysis skill level than another incident-handling dispatcher operating the communication device 210C. The electronic computing device may transmit the single video feed relating to the second incident to the communication device 210 operated by the incident-handling dispatcher with the lower video analysis skill level. In some embodiments, role information relating to dispatchers is entered into the electronic computing device using an input device and is stored in a memory for use as described above with respect to other stored settings and/or rules.

After the electronic computing device executes block 525, the method proceeds back to block 505 to repeat the method 500 as additional data feeds are received from network-connectable devices 105. Accordingly, the electronic computing device repeats the method 500 to dynamically determine whether to present one or more data feeds on the communication device 210 as the quantity of data feeds changes over time.

As described above, at block 520 of FIG. 5, the electronic computing device determines whether to present the one or more data feeds on a communication device 210 based on the incident type and the quantity of data feeds. In some embodiments, regardless of this determination made at block 520, the electronic computing device is configured to store the one or more data feeds received from the one or more network-connectable devices 105. For example, the one or more data feeds are stored in at least one of the first memory 310 of a communication device 210, the second memory 410 of the communication device manager 205, and another memory of a device located at the command center 110, at a remote location, or at a remote cloud-computing cluster.

As mentioned above, in some embodiments, when the electronic computing device determines not to present the one or more data feeds on a communication device 210 based on the incident type and the quantity of data feeds (at block 520), the electronic processor may still transmit the one or more data feeds to the communication device 210 but may also transmit an indication that the data feeds are not to be presented. In such embodiments, the communication device 210 may receive a user input from the incident-handling dispatcher indicating that a selected data feed of the one or more data feeds is to be presented on the communication device 210 and/or on another device such as another communication device 210 or a network-connectable device 105 of an officer. FIG. 6 illustrates a flow chart of a sub-method 600 performed by the electronic computing device for determining whether to present a list of available data feeds on a communication device 210 and for presenting a selected data feed based on a received user input from an incident-handling dispatcher. While a particular order of processing steps, message receptions, and/or message transmissions is indicated in FIG. 6 as an example, timing and ordering of such steps, receptions, and transmissions may vary where appropriate without negating the purpose and advantages of the examples set forth in detail throughout the remainder of this disclosure.

After the electronic computing device determines not to present the one more data feeds on the communication device 210 (as described above with respect to block 520), at block 605, the electronic computing device determines, with the electronic processor, whether to display a list of available data feeds on a communication device 210 based on the quantity of data feeds. In some embodiments, the electronic computing device determines whether to display the list of available data feeds relating to an incident being handled by an incident-handling dispatcher on a corresponding communication device 210 by determining whether the quantity of data feeds is less than a second predetermined threshold that is higher than the first predetermined threshold (for example, less than ten video feeds, less than thirty sensor input data feeds, and the like). For example, when the quantity of video feeds being transmitted to a communication device 210 is more than two but less than ten, the electronic computing device determines to display a list of the available video feeds to allow the incident-handling dispatcher to select one or more video feeds to be displayed on the communication device 210. In some embodiments, the electronic computing device does not display the list of available data feeds when the quantity of data feeds is above the second predetermined threshold in an attempt to avoid overwhelming the incident-handling dispatcher.

Similar to the above explanation regarding the first predetermined threshold with respect to block 520 of FIG. 5, in some embodiments, a memory of the electronic computing device stores settings and/or rules received from a user via an input device to control the second predetermined threshold for one or more types of data feeds. In other words, the settings and/or rules used by the electronic computing device when performing the sub-method 600 are configurable by a user. Also similar to the first predetermined threshold, in some embodiments, the second predetermined threshold may be set differently for each type of data feed. For example, the second predetermined threshold may be higher for sensor input data feeds than for video feeds because video feeds may be more difficult to monitor compared to sensor input data feeds. Also similar to the first predetermined threshold, in some embodiments, the electronic computing device adjusts stored settings and/or rules based on a stored history of user interaction and performance when handling data feeds. Although a second predetermined threshold is described above, in some embodiments, at block 605, the electronic computing device determines to display the list of available data feeds when the quantity of data feeds is less than the first predetermined threshold. In other words, in some embodiments, the electronic computing device uses the same predetermined threshold when performing the method 500 and the sub-method 600.

When the electronic computing device determines not to display a list of available data feeds on the communication device based on the quantity of data feeds (at block 605), the sub-method 600 proceeds to block 505 of FIG. to repeat the method 500 as additional data feeds are received from network-connectable devices 105. On the other hand, when the electronic computing device determines to display a list of available data feeds on the communication device based on the quantity of data feeds (at block 605), the sub-method 600 proceeds to block 610.

Figure 7:
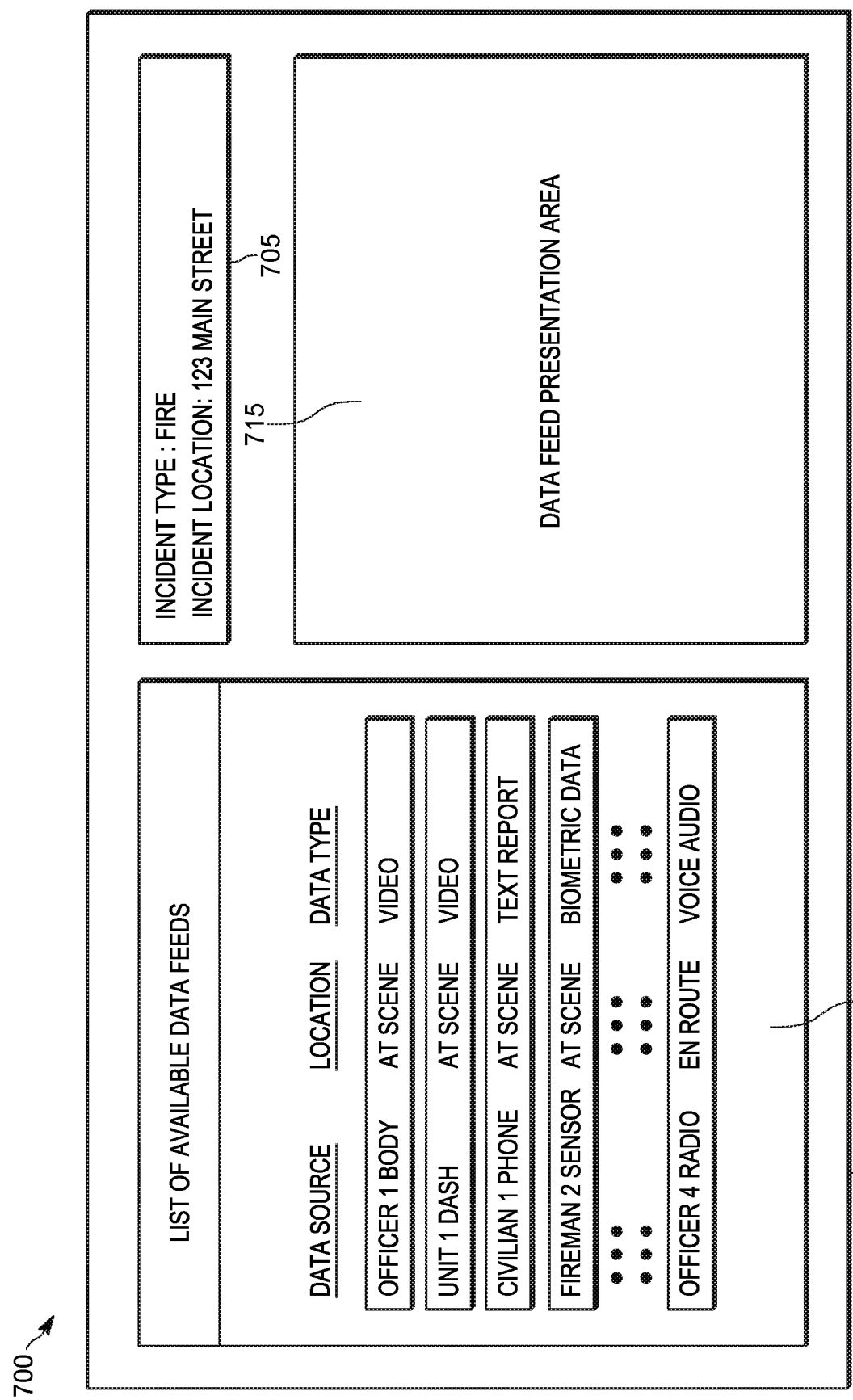
FIG. 7 illustrates a graphical user interface displayed on a display of the communication device of FIG. 3 according to one example embodiment.

At block 610, the communication device 210 displays the list of available data feeds on the communication device 210 in response to the electronic computing device determining, based on the quantity of data feeds, that the list of available data feeds is to be displayed on the communication device 210. For example, FIG. 7 illustrates a graphical user interface 700 displayed on the display 330 of a communication device 210 according to one example embodiment. In the example shown, the graphical user interface 700 includes an incident description textbox 705 that displays information about the incident being handled by the incident-handling dispatcher on the communication device 210. For example, the incident description textbox 705 displays the incident type and the incident location. The graphical user interface 700 also includes a list of available data feeds 710 from a plurality of the one or more network-connectable devices 105. For example, the list of available data feeds includes information relating to each network-connectable device 105 such as data source information (for example, officer 1 body camera, civilian 1 phone, and the like), location information, and data type (for example, video feed, audio feed, text feed, and the like). In some embodiments, the list of available data feeds includes a scroll bar to show additional available data feeds in response to user input. The graphical user interface 700 further includes a data feed presentation area 715 where one or more data feeds are presented. The graphical user interface 700 of FIG. 7 is merely an example and may include fewer or additional components. In some embodiments, the components are arranged in a different manner and the arrangement of each component may be user configurable.

Returning to FIG. 6, at block 615, the communication device 210 determines whether an input device of the communication device 210 has received a selection of an item included in the list of available data feeds 710. For example, when the display 330 is a touch screen, the communication device 210 receives a user input via the touch screen indicating a selection of one of the available data feeds. As another example, the communication device 210 receives a user input via a mouse being operated by the incident-handling dispatcher. For example, the incident-handling dispatcher may be monitoring sensor input data feeds corresponding to the locations of multiple officers as they pursue a suspect on foot. In response to noticing that one of the officers has stopped moving, the communication device 210 may receive a user input from the incident-handling dispatcher selecting a video feed from a body-worn camera of the non-moving to officer to allow the incident-handling dispatcher to view the selected video feed to determine whether the officer needs assistance.

When the electronic computing device determines that an input device of the communication device 210 has not received a selection of an item included in the list of available data feeds 710 (at block 615), the sub-method 600 proceeds to block 505 of FIG. to repeat the method 500 as additional data feeds are received from network-connectable devices 105. In some embodiments, the communication device 210 may continue to monitor for user input via input devices of the communication device 210 when repeating the method 500 such that a selected data feed from the list of available data feeds may be presented in response to a user input via an input device. When the electronic computing device determines that an input device of the communication device 210 has received a selection of an item included in the list of available data feeds 710 (at block 615 or as the method 500 is being repeated), the sub-method 600 proceeds to block 620.

At block 620, the communication device 210 presents, in response to the selection, a selected data feed corresponding to the selection on the communication device 210 and/or on another device such as another communication device 210 or a network-connectable device 105 of an officer. In some embodiments, the communication device 210 presents the selected data feed in the data feed presentation area 715, for example, when the selected data feed is a video feed, an image feed, a text feed, a sensor input feed, and the like. In some embodiments, the communication device 210 presents the selected data feed through the speaker 325, for example, when the selected data feed is an audio feed. In some embodiments, the communication device 210 may present multiple data feeds at once. However, in such embodiments, the communication device 210 may be configured to present a maximum quantity of data feeds at once (for example, two video feeds, ten sensor input data feeds, and the like). For example, when two video feeds are being presented and a third video feed is selected by the incident-handling dispatcher, the communication device 210 stops presenting one of the two video feeds that is currently being presented before presenting the third video feed.

In some embodiments, the electronic computing device or the communication device 210 prioritizes the list of available data feeds 710 based on least one of the group consisting of a location of each of the plurality of the one or more network-connectable devices 105 and a status of each of the plurality of the one or more network-connectable devices 105. For example, as described above, as an example of using a location of the one or more network-connectable devices 105 to prioritize the list of available data feeds 710, video feeds from cameras of officers reporting to the location of the incident may be received by the electronic computing device. However, the electronic computing device may determine that these video feeds would be less useful to the incident-handling dispatcher monitoring and handling the incident than video feeds from officers located at the incident. Accordingly, the electronic computing device may prioritize the list of available data feeds 710 by listing the on-scene data feeds at the top of the list 710 while listing the off-scene data feeds at the bottom of the list 710.

Similarly, as an example of using a status of the one or more network-connectable devices 105 to prioritize the list of available data feeds 710, video feeds from cameras of officers reporting to the location of the incident may be received by the electronic computing device (for example, officers with a status of "en-route"). However, the electronic computing may determine that these video feeds would be less useful to the incident-handling dispatcher monitoring and handling the incident than video feeds from officers located at the incident (for example, officers with a status of "on-scene"). Accordingly, the electronic computing device may prioritize the list of available data feeds 710 by listing the "on-scene" data feeds at the top of the list 710 while listing the "en-route" data feeds at the bottom of the list 710.

Additionally, in some embodiments, the electronic computing device displays one or more of the available data feeds in the list of available data feeds in a shaded-out manner and prevents presentation of such data feeds when selected by the user. For example, when the electronic computing devices determines that a data feed includes gruesome or unpleasant images while providing little value to the dispatcher to help handle the incident as explained above, the electronic computing device displays a listing of the data feed in the list of available data feeds to indicate to the dispatcher that the data feed has been received. However, the electronic computing device may display the data feed in a shaded-out manner to indicate that the dispatcher may not select the data feed to have the data feed presented.

While the above embodiments and examples generally describe each incident as being handled by one incident-handling dispatcher using a communication device 210, in some embodiments, multiple incident-handling dispatchers handle the same incident using respective communication devices 210. For example, for a large incident such as a riot where many data feeds are being received by the electronic computing device, the electronic computing device may transmit a first portion of data feeds associated with the incident to a first communication device 210, a second portion of data feeds associated with the incident to a second communication device 210, and a third portion of data feeds associated with the incident to a third communication device 210. In some embodiments, each portion of the data feeds may be categorized into sub-incidents of the large incident, for example, based on location information.

While a number of the embodiments and examples described above relate to public safety officers handling a public safety incident, in some embodiments, the disclosed methods, devices, and systems are used in other contexts. For example, the disclosed methods, devices, and systems may be used by a security company or in a retail store or a warehouse and at least some of the network-connectable devices 105 may be operated by security guards or employees. As another example, the disclosed methods, devices, and systems may be used by medical personnel in, for example, a hospital. As another example, the disclosed methods, devices, and systems may be used by miners at a mine, oil field, or precious metal or gem field. As another example, the disclosed methods, devices, and systems may be used by air traffic controllers at an airport. As another example, the disclosed methods, devices, and systems may be used by financial analysts using a communication device 210 to receive data feeds related to companies and other financial institutions. In other words, the disclosed methods, devices, and systems may be used in any situation in which it may be useful to determine whether to present one or more received data feeds on a communication device 210 for effective viewing by a user of the communication device 210.

Although the communication device 210 of an incident-handling dispatcher is referred to throughout this specification, these references are merely an example. In some embodiments, the methods described above are performed to determine whether to present one or more data feeds on a communication device 210 of another person such as a video analyst or a public safety intelligence operator. Additionally, while the specification describes an emergency call-taking device, in some embodiments such a device is not limited to a public safety context. Rather, the emergency call-taking device may be any initial data feed-receiving device, for example, that allows a user to categorize and forward data feeds to other devices.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic computing device comprising:
   a network interface configured to receive a plurality of data feeds from one or more network-connectable devices, wherein the plurality of data feeds is associated with an incident,
   an electronic processor configured to
      determine, from a plurality of incident types, an incident type of the incident,
      determine a quantity of data feeds associated with the incident, and
      determine a subset of the plurality of data feeds including less than the quantity of data feeds for presenting on a communication device based on the incident type and the quantity of data feeds, and responsive to the quantity of data feeds being less than a predetermined threshold,
   wherein the subset of the plurality of data feeds is presented via an output device of the communication device in response to determining, based on the incident type and the quantity of data feeds, that the subset of the plurality of data feeds includes at least one of the plurality of data feeds.

2. The electronic computing device of claim 1, wherein the plurality of data feeds include one or more of a video feed, an audio feed, an image feed, a text feed, and a sensor input.

3. The electronic computing device of claim 1, wherein the electronic processor is configured to determine the incident type of the incident based on a user input received by at least one of the group consisting of an initial data feed-receiving device and the one or more network-connectable devices.

4. The electronic computing device of claim 1, wherein the electronic processor is configured to
   determine not to present any of the plurality of data feeds on the communication device based on the incident type and the quantity of data feeds;
   determine whether to display a list of available data feeds on the communication device based on the quantity of data feeds;
   display the list of available data feeds on the communication device in response to determining, based on the quantity of data feeds, that the list of available data feeds is to be displayed on the communication device;
   receive, via an input device of the communication device, a selection of an item included in the list of available data feeds; and
   presenting, in response to the selection, a selected data feed corresponding to the selection.

5. The electronic computing device of claim 4, wherein the list of available data feeds includes a list of available video feeds from a plurality of the one or more network-connectable devices.

6. The electronic computing device of claim 5, wherein the list of available data feeds is prioritized based on at least one of the group consisting of a location of each of the plurality of the one or more network-connectable devices and a status of each of the plurality of the one or more network-connectable devices.

7. The electronic computing device of claim 1, wherein the electronic processor is further configured to determine whether to present the subset of the plurality of data feeds on the communication device based on at least one of the group consisting of a location of the one or more network-connectable devices, a status of the one or more network-connectable devices, a status of the incident, a quantity of network-connectable devices that are providing plurality of data feeds, a quantity of officers handling the incident, and a speed at which the plurality of data feeds is being received.

8. The electronic computing device of claim 1, wherein the electronic processor is configured to select the communication device from among a plurality of communication devices based on a role of a user associated with the communication device.

9. The electronic computing device of claim 1, wherein the electronic processor is configured to store the plurality of data feeds received from the one or more network-connectable devices.

10. A method of determining whether to present a subset of a plurality of data feeds on a communication device, the method comprising:
 receiving, via a network interface of an electronic computing device, plurality of data feeds from one or more network-connectable devices, wherein the plurality of data feeds is associated with an incident;
 determining, with an electronic processor of the electronic computing device, from a plurality of incident types, an incident type of the incident;
 determining, with the electronic processor, a quantity of data feeds associated with the incident;
 determining, with the electronic processor, whether to present a subset portion of the plurality of data feeds less than the quantity on the communication device based on the incident type and the quantity of data feeds, and responsive to the quantity of data feeds being less than a predetermined threshold; and
 presenting the subset portion of the plurality of data feeds via an output device of the communication device in response to determining, based on the incident type and the quantity of data feeds, that the subset portion of the plurality of data feeds is to be presented on the communication device.

11. The method of claim 10, wherein receiving the plurality of data feeds from the one or more network-connectable devices includes receiving one or more of a video feed, an audio feed, an image feed, a text feed, and a sensor input.

12. The method of claim 10, wherein determining the incident type of the incident includes determining the incident type of the incident based on a user input received by at least one of the group consisting of an initial data feed-receiving device and the one or more network-connectable devices.

13. The method of claim 10, further comprising:
 determining, with the electronic processor, not to present any of the plurality of data feeds on the communication device based on the incident type and the quantity of data feeds;
 determining, with the electronic processor, whether to display a list of available data feeds on the communication device based on the quantity of data feeds;
 displaying the list of available data feeds on the communication device in response to determining, based on the quantity of data feeds, that the list of available data feeds is to be displayed on the communication device;
 receiving, via an input device of the communication device, a selection of an item included in the list of available data feeds; and
 presenting, via the communication device in response to the selection, a selected data feed corresponding to the selection.

14. The method of claim 13, wherein displaying the list of available data feeds includes displaying a list of available video feeds from a plurality of the one or more network-connectable devices.

15. The method of claim 14, wherein displaying the list of available data feeds includes prioritizing the available data feeds within the list based on at least one of the group consisting of a location of each of the plurality of the one or more network-connectable devices and a status of each of the plurality of the one or more network-connectable devices.

16. The method of claim 10, further comprising determining whether to present the subset of the plurality of data feeds on the communication device based on at least one of the group consisting of a location of the one or more network-connectable devices, a status of the one or more network-connectable devices, a status of the incident, a quantity of network-connectable devices that are providing the plurality of data feeds, a quantity of officers handling the incident, and a speed at which the plurality of data feeds is being received.

17. The method of claim 10, further comprising selecting, with the electronic processor, the communication device from among a plurality of communication devices based on a role of a user associated with the communication device.

18. The method of claim 10, further comprising storing, with the electronic processor, the plurality of data feeds received from the one or more network-connectable devices.

* * * * *